United States Patent
Innes

(10) Patent No.: US 6,270,553 B1
(45) Date of Patent: Aug. 7, 2001

(54) DIRECT REDUCTION OF METAL OXIDE AGGLOMERATES

(75) Inventor: John Alexander Innes, Kew (AU)

(73) Assignee: Technological Resources Pty. Ltd., Melbourne (CA)

( * ) Notice: Subject to any disclaimer, the term of this patent is extended or adjusted under 35 U.S.C. 154(b) by 0 days.

(21) Appl. No.: 09/331,277

(22) PCT Filed: Dec. 17, 1997

(86) PCT No.: PCT/AU97/00852

§ 371 Date: Aug. 12, 1999

§ 102(e) Date: Aug. 12, 1999

(87) PCT Pub. No.: WO98/27239

PCT Pub. Date: Jun. 25, 1998

(30) Foreign Application Priority Data

Dec. 18, 1996 (AU) .................................. PO 4260

(51) Int. Cl.$^7$ .................................................. C21B 13/02
(52) U.S. Cl. .............................................................. 75/499
(58) Field of Search .............................. 75/499; 266/218, 266/197

(56) References Cited

U.S. PATENT DOCUMENTS

| | | |
|---|---|---|
| Re. 33,464 | 11/1990 | Gitman . |
| 2,647,045 | 7/1953 | Rummel . |
| 3,844,770 | 10/1974 | Nixon . |
| 3,845,190 | 10/1974 | Yosim et al. . |
| 3,888,194 | 6/1975 | Kishigami et al. . |
| 3,890,908 | 6/1975 | von Klenck et al. . |
| 3,894,497 | 7/1975 | Helke et al. . |
| 4,007,034 | 2/1977 | Hartwig et al. . |
| 4,012,226 * | 3/1977 | Geck et al. .............................. 75/499 |
| 4,053,301 | 10/1977 | Stephens, Jr. . |
| 4,083,715 | 4/1978 | Langhammer . |
| 4,145,396 | 3/1979 | Grantham . |
| 4,177,063 | 12/1979 | Dickson . |
| 4,207,060 | 6/1980 | Zangs . |
| 4,356,035 | 10/1982 | Brotzmann et al. . |
| 4,389,043 | 6/1983 | Weber et al. . |
| 4,400,936 | 8/1983 | Evans . |
| 4,402,274 | 9/1983 | Meenan et al. . |
| 4,431,612 | 2/1984 | Bell et al. . |
| 4,447,262 | 5/1984 | Gay et al. . |
| 4,455,017 | 6/1984 | Wunsche . |
| 4,468,298 | 8/1984 | Byrne et al. . |
| 4,468,299 | 8/1984 | Byrne et al. . |

(List continued on next page.)

FOREIGN PATENT DOCUMENTS

| | | |
|---|---|---|
| 23864/84 * | 1/1984 | (AU) . |
| 41064/85 * | 4/1986 | (AU) . |
| 69707/87 * | 9/1987 | (AU) . |

(List continued on next page.)

OTHER PUBLICATIONS

Patent Abstract of Japan, JP, A, 10–280020 (Nippon Steel Corp.), Oct. 20, 1998.

Patent Abstracts of Japan, C–951, p. 24, JP, A, 04–63218 (Kawasaki Heavy Ind. Ltd), Feb. 28, 1992.

Patent Abstracts of Japan, C–627, p. 109, Jp, A, 01–127613 (Kawasaki Steel Corp.), May 19, 1989.

(List continued on next page.)

Primary Examiner—Roy King
Assistant Examiner—Tima McGuthry-Banks
(74) Attorney, Agent, or Firm—Merchant & Gould P.C.

(57) ABSTRACT

A method of producing metals and metal alloys from metal oxides is disclosed. The method comprises the steps of: (a) passing a gas at an elevated temperature through a bed of composite agglomerates that are formed from metal oxides and solid carbonaceous material and thereby reducing metal oxides in the agglomerates to metal and melting the metal; and (b) collecting the molten metal from the agglomerates.

16 Claims, 3 Drawing Sheets

U.S. PATENT DOCUMENTS

| | | |
|---|---|---|
| 4,468,300 | 8/1984 | Byrne et al. . |
| 4,481,891 | 11/1984 | Takeshita et al. . |
| 4,504,043 | 3/1985 | Yamaoka et al. . |
| 4,511,396 | 4/1985 | Nixon . |
| 4,521,890 | 6/1985 | Burnham et al. . |
| 4,565,574 | 1/1986 | Katayama et al. . |
| 4,566,904 | 1/1986 | von Bogdandy et al. . |
| 4,572,482 | 2/1986 | Bedell . |
| 4,574,714 | 3/1986 | Bach et al. . |
| 4,602,574 | 7/1986 | Bach et al. . |
| 4,664,618 | 5/1987 | Gitman . |
| 4,681,599 | 7/1987 | Obkircher . |
| 4,684,448 | 8/1987 | Itoh et al. . |
| 4,701,214 | 10/1987 | Kaneko et al. . |
| 4,718,643 | 1/1988 | Gitman . |
| 4,786,321 | 11/1988 | Hoster et al. . |
| 4,790,516 | 12/1988 | Sugiura et al. . |
| 4,798,624 | 1/1989 | Brotzmann et al. . |
| 4,804,408 | 2/1989 | Fuhringer et al. . |
| 4,836,847 | 6/1989 | Bishop et al. . |
| 4,849,015 | 7/1989 | Fassbinder et al. . |
| 4,861,368 | 8/1989 | Brotzmann et al. . |
| 4,874,427 | 10/1989 | Hamada et al. . |
| 4,890,562 | 1/1990 | Gitman . |
| 4,913,734 | 4/1990 | Romenets et al. . |
| 4,923,391 | 5/1990 | Gitman . |
| 4,940,488 | 7/1990 | Maeda et al. . |
| 4,946,498 | 8/1990 | Weber . |
| 4,976,776 | 12/1990 | Elvander et al. . |
| 4,999,097 | 3/1991 | Sadoway . |
| 5,005,493 | 4/1991 | Gitman . |
| 5,024,737 | 6/1991 | Claus et al. . |
| 5,037,608 | 8/1991 | Tarcy et al. . |
| 5,042,964 | 8/1991 | Gitman . |
| 5,050,848 | 9/1991 | Hardie et al. . |
| 5,051,127 | 9/1991 | Hardie et al. . |
| 5,065,985 | 11/1991 | Takahashi et al. . |
| 5,177,304 | 1/1993 | Nagel . |
| 5,191,154 | 3/1993 | Nagel . |
| 5,222,448 | 6/1993 | Morgenthaler et al. . |
| 5,238,646 | 8/1993 | Tarcy et al. . |
| 5,271,341 | 12/1993 | Wagner . |
| 5,279,715 | 1/1994 | La Camera et al. . |
| 5,301,620 | 4/1994 | Nagel et al. . |
| 5,302,184 | 4/1994 | Batterham et al. . |
| 5,322,547 | 6/1994 | Nagel et al. . |
| 5,332,199 | 7/1994 | Knapp et al. . |
| 5,333,558 | 8/1994 | Lees, Jr. . |
| 5,396,850 | 3/1995 | Conochie et al. . |
| 5,401,295 | 3/1995 | Brotzmann . |
| 5,407,461 | 4/1995 | Hardie et al. . |
| 5,415,742 | 5/1995 | La Camera et al. . |
| 5,443,572 | 8/1995 | Wilkinson et al. . |
| 5,480,473 | 1/1996 | Hardie et al. . |
| 5,489,325 | 2/1996 | Keogh et al. . |
| 5,498,277 | 3/1996 | Floyd et al. . |
| 5,518,523 | 5/1996 | Brotzmann . |
| 5,529,599 | 6/1996 | Calderon . |
| 5,613,997 | 3/1997 | Satchell, Jr. . |
| 5,630,862 | 5/1997 | Greenwalt . |
| 5,640,708 | 6/1997 | Conochie et al. . |
| 5,647,888 | 7/1997 | Keogh et al. . |
| 5,683,489 | 11/1997 | Hayashi et al. . |
| 5,741,349 | 4/1998 | Hubble et al. . |
| 5,800,592 | 9/1998 | den Hartog et al. . |
| 5,802,097 | 9/1998 | Gensini et al. . |
| 5,869,018 | 2/1999 | Stephens, Jr. . |
| 5,871,560 | 2/1999 | Fluch et al. . |
| 5,938,815 | 8/1999 | Satchell, Jr. . |
| 6,083,296 | 7/2000 | Innes et al. . |
| 6,143,054 | 11/2000 | Dry . |
| B1 4,940,488 | 8/1999 | Maeda et al. . |

FOREIGN PATENT DOCUMENTS

| | | | |
|---|---|---|---|
| 22448/88 | * | 5/1989 | (AU) . |
| 26831/88 | * | 7/1989 | (AU) . |
| 28802/89 | * | 4/1990 | (AU) . |
| 42859/89 | * | 4/1990 | (AU) . |
| 49307/90 | * | 9/1990 | (AU) . |
| 49309/90 | * | 9/1990 | (AU) . |
| 74840/91 | * | 10/1991 | (AU) . |
| 90957/91 | * | 8/1992 | (AU) . |
| 48938/93 | * | 4/1994 | (AU) . |
| 48937/93 | * | 5/1994 | (AU) . |
| 50820/96 | | 1/1997 | (AU) . |
| 9400123 | | 9/1995 | (BR) . |
| 3139375 | | 4/1983 | (DE) . |
| 3244744 | | 5/1984 | (DE) . |
| 41 39 236 | | 5/1993 | (DE) . |
| 079 182 A1 | | 5/1983 | (EP) . |
| 084 288 A1 | | 7/1983 | (EP) . |
| 422 309 | | 4/1991 | (EP) . |
| 541 269 A1 | | 5/1993 | (EP) . |
| 592 830 A1 | | 4/1994 | (EP) . |
| 657 550 | | 6/1995 | (EP) . |
| 2 043 696 | | 10/1980 | (GB) . |
| 2 088 892 | | 6/1982 | (GB) . |
| 59-159944 | | 9/1984 | (JP) . |
| 10-219343 | | 8/1998 | (JP) . |
| WO 89/01981 | | 3/1989 | (WO) . |
| WO 92/12265 | | 7/1992 | (WO) . |
| WO 93/06251 | | 4/1993 | (WO) . |
| WO 94/19497 | | 9/1994 | (WO) . |
| WO 96/19591 | | 6/1996 | (WO) . |
| WO 96/31627 | | 10/1996 | (WO) . |
| WO 97/17473 | | 5/1997 | (WO) . |
| WO 97/20958 | | 6/1997 | (WO) . |
| WO 97/23656 | | 7/1997 | (WO) . |
| WO 98/27232 | | 6/1998 | (WO) . |
| WO 98/27239 | | 6/1998 | (WO) . |
| WO 99/16911 | | 4/1999 | (WO) . |

OTHER PUBLICATIONS

Patent Abstracts of Japan, C–951, JP, A, 4–63217 (Kawasaki Heavy Ind. Ltd.), Feb. 28, 1992.

Patent abstracts of Japan, C–497, p. 115, JP, A, 62–280315 (Nippon Kokan K.K), Dec. 15, 1987.

Derwent Abstract Accession No. 87–039748/06 Class Q77, JP, A, 61–295334, Dec. 26, 1986.

* cited by examiner

DIRECT REDUCTION OF METAL OXIDE AGGLOMERATES

The present invention relates generally to the production of metals and metal alloys from metal oxides.

The term "metal oxides" is understood herein to include, but is not limited to, metal oxides in ores and partially reduced ores.

The present invention relates particularly to the production of metallic iron from iron oxides in the form of ores and/or partly reduced ores.

An object of the present invention is to provide a method and a apparatus for producing metals and metal alloys which is an alternative to conventional methods and apparatus.

According to the present invention there is provided a method of producing metals and metal alloys from metal oxides, which method comprises:

(a) passing a gas at an elevated temperature through a bed of composite agglomerates that are formed from metal oxides and solid carbonaceous material and thereby reducing metal oxides in the agglomerates to metal and melting the metal; and (b) collecting the molten metal from the agglomerates.

The present invention is based on the realization that composite agglomerates of metal oxides (such as iron oxides) and carbonaceous material (such as coal), and optionally fluxes and binders, can be produced with suitable structural properties (such as porosity and strength) and composition:

(i) to enable the agglomerates to be formed into a bed of agglomerates: and (ii) to be an effective medium for reduction of metal oxides in the agglomerates to metal and melting of the metal in the presence of a gas at an elevated temperature.

Unlike known agglomerate-based processes for reducing iron oxides, such as the FASTMET process of Midrex Steel Corporation, which reduce iron oxides in the form of pellets to metallic iron but are operated under conditions to avoid forming molten iron, the process of the present invention deliberately operates under conditions to produce molten metal from the agglomerates.

The term "elevated temperature" is understood to mean a temperature that is above the melting point of the metal formed by the reduction of the metal oxides.

It can readily be appreciated that in any given situation the minimum elevated temperature will depend on the specific metal oxides being treated. By way of example, in the case of iron oxides, the minimum elevated temperature is of the order of 1250/1300° C.

It is preferred that the gas have some reducing potential.

The gas may be of any suitable composition.

It is preferred that the gas in part comprise CO and $H_2$.

It is preferred particularly that the gas be an off-gas produced in a molten bath-based smelter.

In this connection, the present invention is based on the realization that the bed is an efficient means of utilizing the sensible heat released from a molten bath-based smelter and of filtering dusts/molten material retained in off-gas produced in such a smelter.

It is preferred that the method comprises transferring at least a part of the gas released form the bed to the smelter.

In one embodiment it is preferred that the method comprises injecting a reducing gas and an oxygen-containing gas into a gas space above the surface of a molten bath in the smelter to combust a portion of the reducing gas to generate heat to maintain the bath in a molten state.

In another embodiment it is preferred that the method comprises injecting metal oxides and a solid carbonaceous material into the molten bath in the smelter and reducing the metal oxides to metal and thereafter melting the metal.

In this embodiment it is particularly preferred that the method comprises infecting an oxygen-containing gas into a gas space above the surface of molten bath in the smelter to combust a portion of combustible material in the gas space.

It is preferred that the method comprises causing splashes and/or droplets of molten metal and/or slag to be ejected upwardly from the molten bath into the gas space to form a transition zone in which heat generated by combustion of reducing gas in the gas space is transferred to the splashes and/or droplets of molten metal and/or slag and thereafter is transferred to the molten bath when the splashes and/or droplets of molten metal and/or slag fall back into the molten bath.

It is preferred particularly that the transition zone be formed by injecting a carrier gas and metal oxides and/or the carbonaceous material into the molten bath to penetrate the molten bath and cause the upward eruption of splashes and/or droplets of molten metal and/or slag.

It is preferred that the oxygen-containing gas be air.

It is preferred particularly that the air be heated.

It is preferred that the bed be located on a structure that:

(i) supports the bed;

(ii) allow gas to pass through the structure to contact the agglomerates; and (iii) allows molten metal to drain from the bed for collection.

It is preferred that the structure comprise a water-colored grid to support the bed.

It is preferred that the structure further comprises a layer of a support medium on the grid.

The support medium may be any suitable material, such as a ceramic or refractory material.

The agglomerates may be of any suitable shape.

It is preferred that the agglomerates be in the form of pellets or briquettes.

It is preferred particularly that the agglomerates be pellets having a diameter in the range of 10–25 mm.

It is preferred that the agglomerates be formed from finely ground metal oxides and carbonaceous material.

The agglomerates may be formed by any suitable means.

The metal oxides may be any suitable metal oxides.

It is preferred that the metal oxides be iron oxides.

The carbonaceous material may be any suitable solid carbonaceous material, such as coal or coke.

It is preferred that the carbonaceous material be soft coking coal.

It is preferred that the agglomerates further comprise a flux to combine with impurities in the metal oxides and the carbonaceous material to form a molten slag which coats the molten metal and thereby inhibits oxidation of the metal.

The flux may be any suitable material, such as lime/limestone.

The relative proportions of the constituents of the agglomerates may be selected as required.

As one example, it is preferred that the proportions of metal oxides, carbonaceous material, and flux be 55%, 35%, and 10%, respectively, on a weight basis.

It is preferred that the agglomerates further comprise a binder.

The binder may be any suitable material, such as bentonite.

It is preferred that the method comprises continuously or periodically adding agglomerates to the bed to replace agglomerates consumed in the method.

It is preferred that the method comprises pre-heating agglomerates prior to adding agglomerates to the bed.

It is preferred that the method comprises controlling the addition of agglomerates to the bed to maintain a pre-determined bed depth.

In any given situation, the required bed depth will depend on a range of factors including, but not limited to, the structural properties of the agglomerates and the properties, such as temperature, of the gas.

According to the present invention there is provided an apparatus for producing metals and metal alloys from metal oxides, which apparatus comprises:

(a) a metallurgical vessel having:
   i) a lower section adapted to retain a bath or molten metal,
   ii) an inlet for introducing gas into the vessel;
   iii) an outlet for discharging gas from the vessel; and
   iv) a structure for supporting a bed of agglomerates in the vessel above the inlet, the structure being formed to allow gas flowing to the outlet to flow through the bed of agglomerates and molten metal produced by reduction to metal of metal oxides in the agglomerates to drain from the bed into the molten bath;

(b) a means for supplying gas to the vessel; and (c) a means for supplying agglomerates to the bed.

It is preferred that the gas have some reducing potential.

It is preferred that the vessel further comprises an outlet for discharging molten metal.

It is preferred that the structure comprise a water-cooled grid to support the bed of agglomerates.

It is preferred that the structure further comprises a layer of a support medium on the grid.

BRIEF DESCRIPTION OF THE DRAWINGS

The present invention is described further by way of example with reference to the accompanying drawings, of which:

With reference to FIG. 1, in accordance with one embodiment of the invention, agglomerates 3 of iron ore, soft coking coal, limestone/lime, and bentonite are supplied to a metallurgical vessel 11 to form a packed bed 5 that is supported by means of a water cooled grid 7 above a bath 9 of molten iron and slag in the vessel 11.

Figure 1:
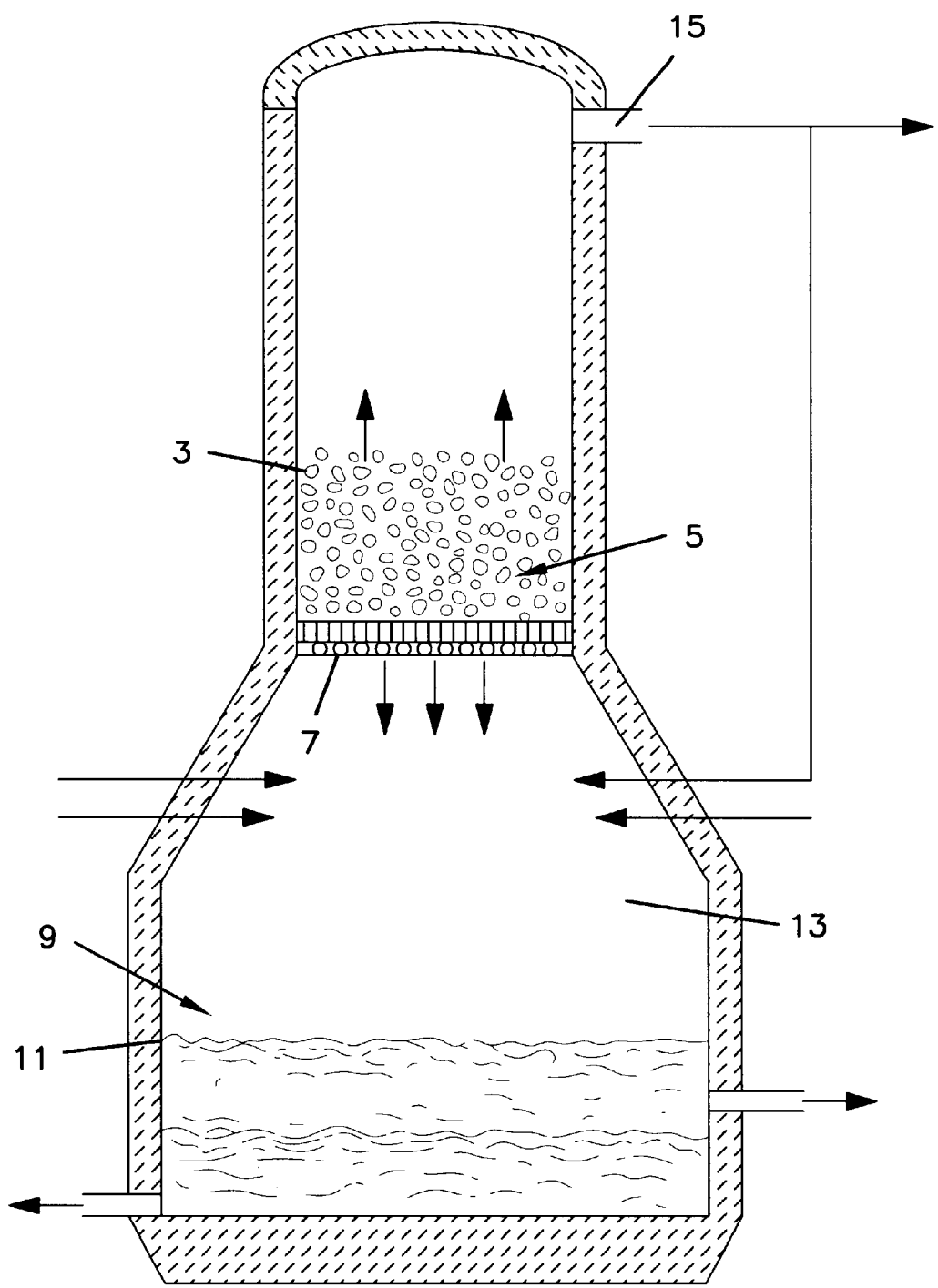
FIG. 1 illustrates in diagrammatic form one embodiment of the present invention.

In order to minimize the possibility of agglomerates falling through grid 7, a layer of pieces of ceramic material and/or coke and/or other suitable material that are larger than the agglomerates 3 may be positioned on the grid 7.

A suitable reducing gas (such as natural gas) and hot air are injected in to the space 13 in the vessel 11 that is between the molten bath 9 and the grid 7. The hot air combusts a portion of the reducing gas and generates heat which maintains metal and slag in the bath 9 in a molten state.

A stream of off-gas at a temperature of the order of 1600° C. flows upwardly from the gas space 13 through the grid 7 and the bed 5 of agglomerates 3 to an off-gas outlet 15 in an upper section of the vessel 11. The off-gas is cooled to a temperature of the order of 800° C. as it passes through the bed 5 of agglomerates 3. A portion of the off-gas is recycled to the gas space 13 between the bath 9 and the grid 7.

The off-gas contains a mixture of reducing gas, hot air, and reaction products produced by the combustion of the portion of the reducing gas in the space 11.

The off-gas contacts the agglomerates with the result that:
(i) the coal reacts to provide a source of fuel and reductant;
(ii) the iron oxides are reduced by the off-gas and the reacted coal to metallic iron which then melts to form droplets; and
(iii) the limestone/lime reacts with impurities in the iron oxides to form a molten slag that coats the molten iron droplets and thereby inhibits oxidation of the iron.

The molten iron/skag droplets drain downwardly from the packed bed 5 into the molten bath 9.

Periodically, molten iron and slag are tapped from the vessel 11.

The reduction of the iron oxides in the agglomerates produces CO which mixes with the off-gas stream and is discharged from the off-gas outlet 15. As a consequence, the off-gas stream discharge from the vessel 11 at least retains some reducing capacity and, therefore, recycling at leas a portion of the off-gas to the gas space 13 is beneficial.

Periodically or continuously, additional agglomerates 3 are supplied to the bed 5 to replace agglomerates 3 in the bed 5 that have been consumed in the reduction reactions. Preferably, the rate of addition is controlled to maintain a generally constant bed depth.

The agglomerates 3 may be formed by any suitable means and be of any suitable shape and dimensions. The preferred agglomerates 3 are pellets and briquettes.

In the case of pellets, it is preferred that the pellets be 10–25 mm in diameter and, as one example, that the proportions of iron oxide, coal, and limestone/lime, on a weight basis, be 55%, 35%, and 10%, respectively, One advantage of the above described embodiment is that the agglomerates 3 are an effective medium for the reducing iron oxides to metallic iron and melting the metallic iron to form molten iron by contact with a gas having a reducing capacity at an elevated temperature.

Another advantage of the embodiment is that the agglomerates 3 can be formed by conventional equipment that does not require substantial capital outlay and can be stockpiled and handled with out significant agglomerate breakdown.

Another advantage of the embodiment is that it is capable of operating on a high tonnage basis.

Figure 2:
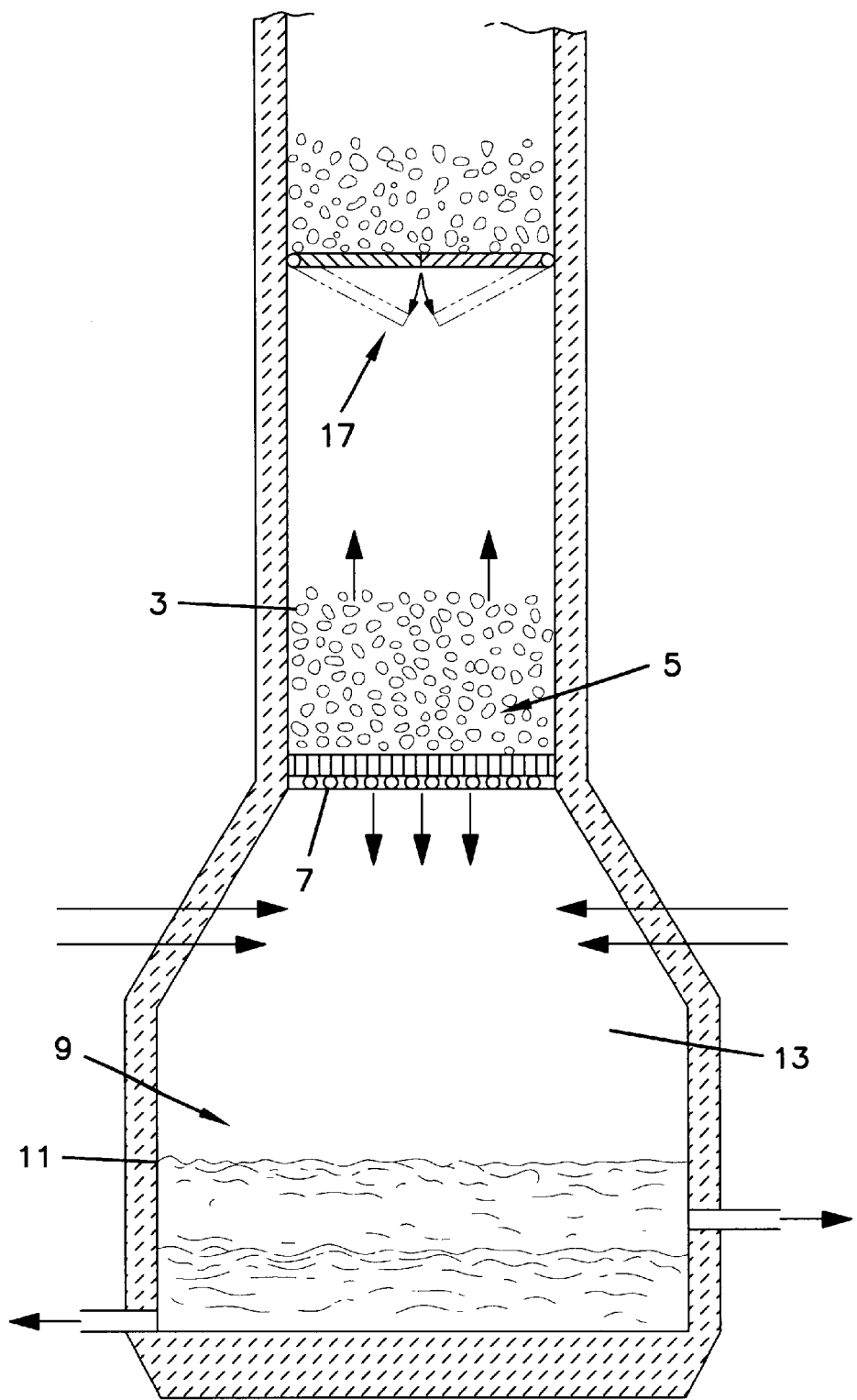
FIG. 2 illustrates in diagrammatic form an improvement of the embodiment shown in FIG. 1.

With reference to FIG. 2, in order to improve energy efficiency of the embodiment shown in FIG. 1, agglomerates 3 for the bed 5 are supplied first to a support structure 17 in an upper section of the vessel 11 and are dried and carbonised by off-gas that flows from the bed 5. The support structure 17 may be of any suitable configuration which can release treated agglomerates on a batch or continuous basis to the bed 5.

Figure 3:
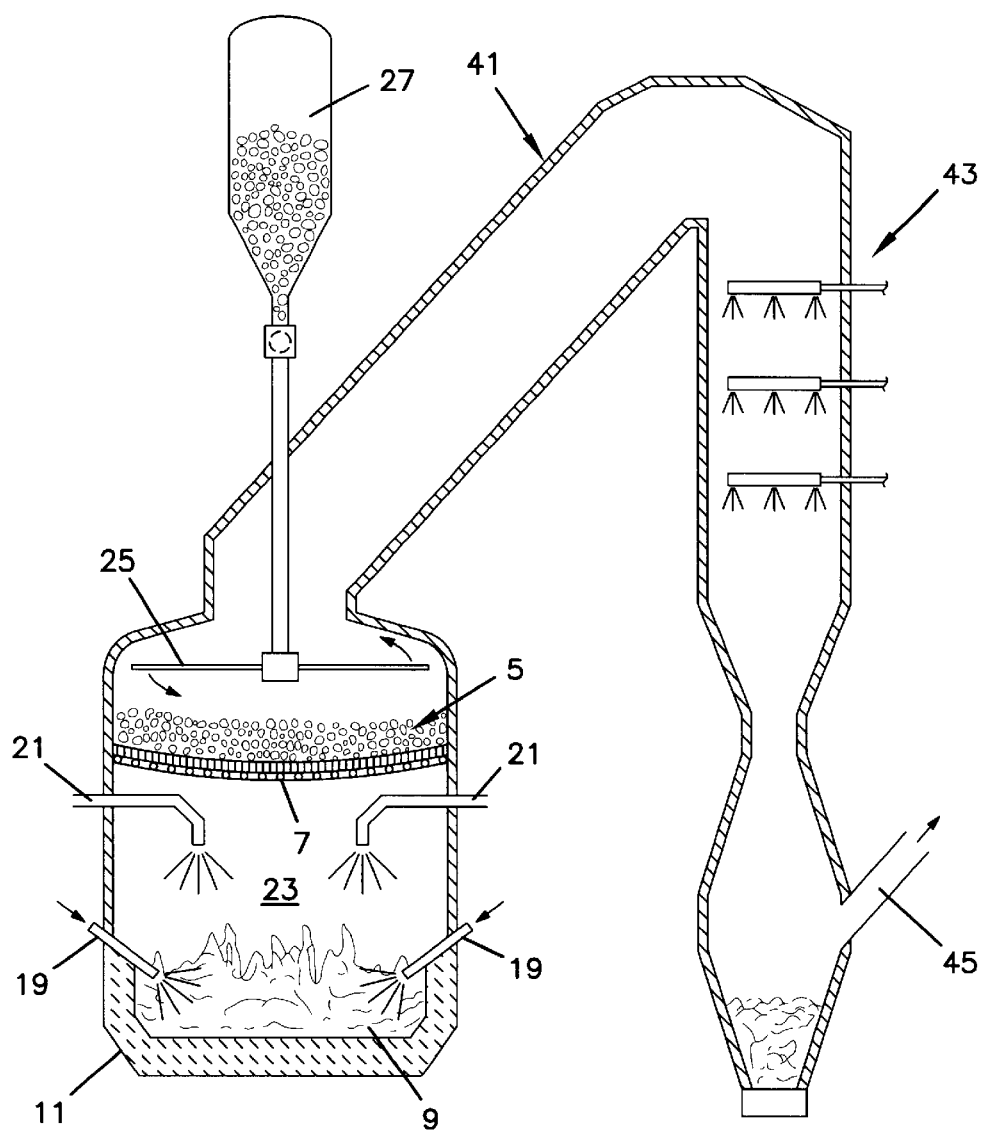
FIG. 3 illustrates in diagrammatic form another embodiment of the present invention.

With reference to FIG. 3, in accordance with another embodiment of the invention, which is based on the embodiment shown in FIG. 1, molten iron is generated by:
(i) reducing and melting agglomerates 3 of iron ore, soft coking coal, limestone/lime, and bentonite in a packed bed 5 of agglomerates located directly above a molten bath 9, and
(ii) using the molten bath 9 as a medium for reducing/melting iron ore injected into the molten bath 9.

Specifically, iron ore, partially reduced iron ore (including highly reduced iron ore), char, and fluxes entrained in a suitable carrier gas, such as nitrogen, are injected into the vessel 11 via lances 19 positioned in the sides (and/or the top) of the vessel 11.

In addition, hot air is injected via lances 21 into the vessel 11.

The iron ore is reduced in the molten bath 9 and converted to molten iron.

The lances 19 are positioned to inject the solid feed materials into the vessel 1 to penetrate the molten bath 9 and then cause an upward eruption of splashes, streams, and droplets of molten iron and/or slag into a space above the surface of the molten bath 9 to form a transition zone 23.

The hot air blasts are injected into the vessel 11 towards the transition zone 23 to cause post-combustion of a portion of gases, such as CO and $H_2$, released from the molten bath, and to direct the heat released by the post-combustion into the transition zone 23 to enable transfer of the heat to splashes, streams, and droplets of molten iron and/or slag and, thereafter, transfer of the heat to the molten bath 9 after the splashes, streams, and droplets return to the molten bath 9.

The off-gas produced by these molten-bath based reactions and any unreacted gas flows upwardly through the packed bed 5 of agglomerates 3 supported on a water-cooled grid 7 in an upper section of the vessel 11, with the result that:

(i) the coal in the agglomerates 3 reacts to provide a source of fuel and reductant;

(ii) the iron oxides in the agglomerates 3 are reduced to metallic iron by the off-gas and the reacted coal, and the metallic iron melts and forms droplets; and (iii) the limestone/lime in the agglomerates 3 reacts with impurities in the iron oxides to form a molten slag that coats the droplets and thereby inhibits oxidation of the iron.

The agglomerates 3 are supplied to the packed bed 5 via a hopper 27, and a rotary spreader assembly 25 is provided to distribute agglomerates 3 from the hopper 27.

The packet bed 5 of agglomerates 3 is an efficient means of making use of the sensible heat in the off-gas produced by the iron-bath based reactions.

A further advantage is that the packed bed 5 provides an effective filter for entrained solid and molten material in the off-gas.

The off-gas that flows upwardly from the packed bed 5 is discharged from the vessel 11 via a conduit 41 and is supplied to an upper end of a water scrubbing system which quenches the off-gas and removes any remaining entrained solid material in the off-gas.

The cooled and cleaned off-gas is discharged from the water scrubbing system via an outlet 45.

Many modifications may be made to the preferred embodiments of the process and apparatus of the present invention as described above with out departing from the spirit and scope of the invention.

For example, whilst the transition zone 23 is formed in the preferred embodiment shown in FIG. 3 by injection of solid materials into the molten bath 9 via lances 19 positioned above the bath 9, it can readily be appreciated that the present invention is not restricted to this arrangement and extends to other means for forming the transition zone 23. Specifically, the transition zone 23 may be formed by bottom injection of suitable gas.

In the claims which follows and in the preceding description of the invention, the words "comprising" and "comprises" are used in the sense of the word "including", is the features referred to in connection with these words may be associated with other features that are not expressly described.

What is claimed is:

1. A method of producing metals and metal alloys from metal oxides, which method comprises the steps of:

(a) injecting metal oxides and a solid carbonaceous material into a molten bath in a smelter and reducing the metal oxides to molten metal and producing an off-gas;

(b) passing the off-gas at an elevated temperature, as defined herein, through a bed of composite agglomerates that are formed from metal oxides and solid carbonaceous material and thereby reducing metal oxides in the agglomerates to metal and melting the metal; and (c) collecting the molten metal from the agglomerates.

2. The method defined in claim 1 wherein off-gas has reducing potential.

3. The method defined in claim 2 wherein the off-gas comprises CO and $H_2$.

4. The method defined in claim 1 comprises transferring at least a part of a gas released from the bed to the smelter.

5. The method defined in claim 4 comprises injecting an oxygen-containing gas into a gas space above the surface of the molten bath in the smelter.

6. The method defined in claim 5 comprises causing splashes and/or droplets of molten metal and/or slag to be ejected upwardly from the molten bath into the gas space to form a transition zone in which heat generated by combustion of combustible material in the gas space is transferred to the splashes and/or droplets of molten metal and/or slag and thereafter is transferred to the molten bath when the splashes and/or droplets of molten metal and/or slag fall back into the molten bath.

7. The method defined in claim 6 comprises forming the transition zone by injecting a carrier gas and metal oxides and/or the carbonaceous material into the molten bath to penetrate the molten bath and cause the upward eruption of splashes and/or droplets of molten metal and/or slag.

8. The method defined in claim 1 comprises injecting a reducing gas and an oxygen-containing gas into a gas space above the surface to the molten bath in the smelter to combat a portion of the reducing gas to generate heat to maintain the bath in a molten state.

9. The method defined in claim 8 wherein the oxygen-containing gas is air.

10. The method defined in claim 1 wherein the agglomerates are in the form of pellets or briquettes.

11. The method defined in claim 10 wherein the agglomerate are pellets having a diameter in the range of 10–25 mm.

12. The method defined in claim 10 wherein the agglomerates are formed from finely ground metal oxides and carbonaceous material.

13. The method defined in claim 12 wherein the agglomerates further comprise a flux to combine with impurities in the metal oxides and the carbonaceous material to form a molten slag which coats the molten metal and thereby inhibits oxidation of the metal.

14. The method defined in claim 1 comprises continuously or periodically adding agglomerates to the bed to replace agglomerates consumed in the method.

15. The method defined in claim 14 comprises controlling the addition of agglomerates to the bed to maintain a pre-determined bed depth.

16. The method defined in claim 1 comprises pre-heating agglomerates prior to adding agglomerates to the bed.

* * * * *